(12) United States Patent
Chou et al.

(10) Patent No.: US 7,099,497 B2
(45) Date of Patent: Aug. 29, 2006

(54) CAPACITIVE FINGERPRINT SENSOR

(75) Inventors: Bruce C. S. Chou, Hsin Chu (TW); Ben Chang, Hsin Chu (TW); Wallace Y. W. Cheng, Hsin Chu (TW)

(73) Assignee: LighTuning Tech. Inc., Hsinchu (TW)

( * ) Notice: Subject to any disclaimer, the term of this patent is extended or adjusted under 35 U.S.C. 154(b) by 693 days.

(21) Appl. No.: 10/403,052

(22) Filed: Apr. 1, 2003

(65) Prior Publication Data

US 2003/0190061 A1 Oct. 9, 2003

(30) Foreign Application Priority Data

Apr. 3, 2002 (TW) .............................. 91106806 A

(51) Int. Cl.
*G06K 9/00* (2006.01)

(52) U.S. Cl. ....................................... 382/124

(58) Field of Classification Search ................ 382/108, 382/115–116, 120, 124, 312; 257/296; 320/166; 324/661, 663; 365/149
See application file for complete search history.

(56) References Cited

U.S. PATENT DOCUMENTS

| | | | |
|---|---|---|---|
| 4,053,228 A | | 10/1977 | Schiller |
| 4,290,052 A | | 9/1981 | Eichelberger et al. |
| 4,340,300 A | | 7/1982 | Ruell |
| 4,353,056 A | | 10/1982 | Tsikos |
| 5,325,442 A | | 6/1994 | Knapp |
| 6,016,355 A | | 1/2000 | Dickinson et al. |
| 6,049,620 A | | 4/2000 | Dickinson et al. |
| 6,055,324 A | * | 4/2000 | Fujieda ........................ 382/124 |
| 6,097,195 A | * | 8/2000 | Ackland et al. ............. 324/719 |
| 6,538,456 B1 | * | 3/2003 | Dickinson et al. .......... 324/658 |
| 6,636,053 B1 | * | 10/2003 | Gozzini ....................... 324/658 |
| 6,714,666 B1 | * | 3/2004 | Morimura et al. .......... 382/124 |
| 2001/0022337 A1 | | 9/2001 | Basse et al. |

FOREIGN PATENT DOCUMENTS

DE 197 56 560 A1 7/1999

OTHER PUBLICATIONS

Lee, et al. "A 600-dpi capacitive fingerprint sensor chip and image-synthesis technique", IEEE, pp. 469-475, 1999.*

* cited by examiner

*Primary Examiner*—Daniel Miriam
(74) *Attorney, Agent, or Firm*—Birch, Stewart, Kolasch & Birch, LLP

(57) ABSTRACT

A capacitive fingerprint sensor includes a plurality of capacitive sensing members arranged in a 2D array. A charge-sharing principle is utilized to read signals in the capacitive sensing member. Each capacitive sensing member includes an insulating surface layer, a sense electrode, a reference electrode, a reference capacitor, and a signal reading circuit. The sense electrode is below the insulating surface layer. When a finger contacts the insulating surface layer, a sense capacitor is formed therebetween. The reference capacitor is connected between the reference and sense electrodes. The signal reading circuit is connected to the sense and reference electrodes, repeatedly provides control signals to charge the reference capacitor and then enable the reference and sense capacitor to share charges. Finally, the sense voltage of the sense electrode may be read.

10 Claims, 6 Drawing Sheets

CAPACITIVE FINGERPRINT SENSOR

BACKGROUND OF THE INVENTION

1. Field of the Invention

The invention relates to a capacitive fingerprint sensor, and more particularly to a capacitive fingerprint sensor which operates on a principle of charge-sharing.

2. Description of the Related Art

There are many known techniques of identifying an individual through the identification of the individual's fingerprint. The use of an ink pad and the direct transfer of ink by the thumb or finger from the ink pad to a recording card is the standard way of making this identification. Then, an optical scanner scans the recording card to get an image, which is then compared to fingerprint images in the computer database. However, the most serious drawback of the above-mentioned method is that the fingerprint identification cannot be processed in real-time, and thus cannot satisfy the requirement of real-time authentication, such as network authentication, e-business, portable electrical products, personal ID card, security system, and the like.

The method for reading a fingerprint in real-time has become the important technology in the biometrics market. The conventional method for reading a fingerprint in real-time belongs to an optical method, which is disclosed in, for example, U.S. Pat. Nos. 4,053,228 and 4,340,300. However, fingerprint sensors utilizing the methods may disadvantageously have large sizes and tend to be tricked by a fake image.

Consequently, chip fingerprint sensors, which overcome the drawbacks of the optical sensor and are formed by silicon semiconductor technology, are developed. According to the consideration of silicon integrated circuit (IC) processes, the capacitive fingerprint sensor has become the most direct and simple product. Tsikos discloses, in U.S. Pat. No. 4,353,056, a capacitive fingerprint sensor including capacitive sensing members arranged in a two-dimensional (2D) array, wherein capacitors formed between the plate electrodes and finger ridges are used to detect the fingerprint. However, Tsikos's method for utilizing an external circuit to sequentially scan each capacitor tends to be influenced by the wire's parasitic capacitance, and better image quality cannot be obtained accordingly. Knapp discloses substantially the same design in U.S. Pat. No. 5,325,442 except for one difference. Instead of sequential scan in Tsikos's patent, Knapp utilizes a single thin film transistor switch to control each capacitive sensing member, and the capacitors are charged by current so that the signals can be read. The capacitance differences between the capacitive sensing members can be obtained by measuring different charging currents. However, the problem of the wire's parasitic capacitance still cannot be effectively solved. Dickinson et al. disclose, in U.S. Pat. Nos. 6,016,355 and 6,049,620, a method for discharging capacitors in constant voltage, and the manufacturing processes of silicon ICs are used. Each capacitive sensing member utilizes a charge/discharge switch composed of a plurality of MOS transistors. First, each capacitor is charged to a constant voltage. Next, an external circuit controls a constant discharging current within a fixed time interval, the capacitance can be obtained by measuring the after-discharged voltage, and the 2D-image reading of the capacitance can thus be completed.

In the reading method by charging/discharging, however, the drawback resides in that the discharge MOS switches (controlled by external current mirrors) of each capacitive sensing member of the sensor must have uniform properties. Since a typical fingerprint sensor may include ten thousands of sensing members, it is difficult to control the uniformity of each discharge MOS in the manufacturing processes, and the uniformity of the output fingerprint signals is deteriorated. Although a larger discharge current may enhance the sensitivity of the sensing member, the power consumption thereof may also be increased. In a small discharge current, enlarging the time interval is needed to obtain enough sensitivity, the image acquiring speed has to be sacrificed.

SUMMARY OF THE INVENTION

An object of the invention is to provide a capacitive fingerprint sensor, which applies a charge-sharing principle to detect the capacitance corresponding to the fingerprint.

Another object of the invention is to provide a capacitive fingerprint sensor, which applies a charge-sharing principle and a shutter switch to instantly detect the capacitance corresponding to the fingerprint.

To achieve the above-mentioned objects, the invention provides a capacitive fingerprint sensor, which includes a plurality of capacitive sensing members arranged in a 2D array. Each capacitive sensing member includes an insulating surface layer, a sense electrode, a reference electrode, a reference capacitor, and a signal reading circuit. A finger may contact the insulating surface layer. The sense electrode is under the insulating surface layer, and a sense capacitor is formed between the sense electrode and finger when the finger contacts the insulating surface layer. The reference electrode is below the sense electrode. The reference capacitor is connected between the reference electrode and sense electrode. The signal reading circuit is connected to the sense electrode and reference electrode. Externally applied repeating control voltages enable the signal reading circuit to charge the reference capacitor first so as to accumulate charges, and then enable the reference capacitor and sense capacitor to share the charges. Finally, the sense voltage at the point of the sense electrode is measured and transferred to the peripheral circuit.

The peripheral circuit basically includes a row decoder, control lines, a column multiplexer, signal lines, and an amplifier. The row decoder is arranged beside the sensing members array. The control lines are connected to the row decoder and inserted in parallel into the sensing members array to provide control voltages to the signal reading circuit in the capacitive sensing member. The column multiplexer is arranged beside the sensing members array and at a side perpendicular to the row decoder. The signal lines are vertically inserted into the sensing members array in order to output voltage signals from the signal reading circuits to the multiplexer. The amplifier amplifies the signals from the multiplexer. First, the peripheral circuit provides a set of the same first and second control voltages to the signal reading circuit for reset function to make two terminals of the reference capacitor have voltage difference so as to accumulate charges and clean effectively the residual charges of the sense capacitor. Then, the peripheral circuit provides another set of the same third and fourth control voltages and a pulse control voltage to the signal reading circuit so as to enable the sense capacitor and reference capacitor to share charges and to read the sense signals.

The above and other objects, advantages and features of the invention will be more apparent from the following description with reference to the accompanying drawings.

DETAILED DESCRIPTION OF THE INVENTION

Unlike the designs of reading circuits in other capacitive fingerprint sensors, the invention utilizes a charge-sharing principle to read the capacitance. The principle basically comes from the design of a dynamic random access memory (DRAM) except for the difference residing in that the DRAM utilizes wire's parasitic capacitor as a reference capacitor and the output of the DRAM is binary output (0 or 1). Instead, the invention utilizes a specific reference capacitor, and the ratios of each reference capacitance to a corresponding sense capacitance are precisely controlled. Hence, even if there are errors in manufacturing the sensing members, good image uniformity may be obtained as long as the ratios of each sense capacitance to each corresponding reference capacitance of the sensing members in a local area can be kept the same. The effect can be obtained according to the actual IC manufacturing technology. Furthermore, the circuit architecture for implementing the charge-sharing principle is quite simple, and the sensitivity of each sensing member may be effectively enhanced.

Figure 1:
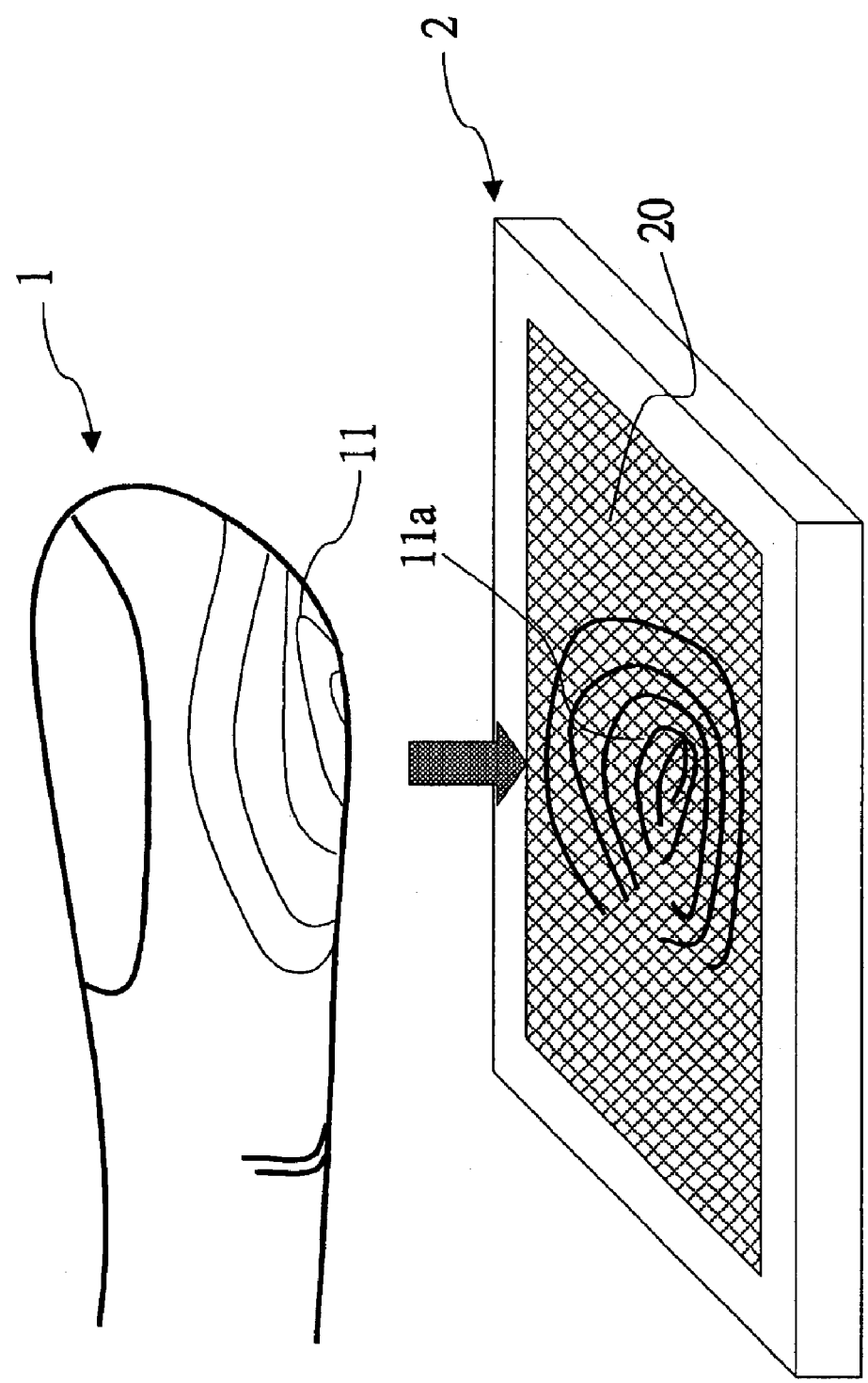
FIG. 1 is a schematic illustration showing the finger contacting the capacitive fingerprint sensor of the invention.

Referring to FIG. 1, a fingerprint sensor 2 includes a plurality of capacitive sensing members 20 arranged in a 2D array. When a finger 1 contacts the sensor 2, irregular ridges 11 on the skin of the finger 1 contact the capacitive sensing members 20 and capacitance curves 11a corresponding to the ridges 11 may be obtained from the sensor 2. By measuring the capacitance curves 11a, the shape of the fingerprint ridges 11 may be obtained.

The detailed architecture of the sensor in FIG. 1 will be described with reference to FIGS. 2 and 3. The capacitive fingerprint sensor mainly includes a capacitive sensing members array 201, an insulating surface layer 30 having a finger's contact surface, and a basic peripheral circuit composed of a row decoder 203, a column multiplexer 204, and a plurality sets of control lines 213 and a plurality signal lines 214. The row decoder 203 is arranged beside the sensing members array 201. The plurality sets of control lines 213 are inserted in parallel in the sensing members array 201 and connected to the row decoder 203. The column multiplexer 204 is arranged beside the sensing members array 201 and at a side perpendicular to the row decoder 203. The signal lines 214 are vertically inserted in the sensing members array 201 to intersect the control lines 213, and is connected to the column multiplexer 204.

Figure 2:
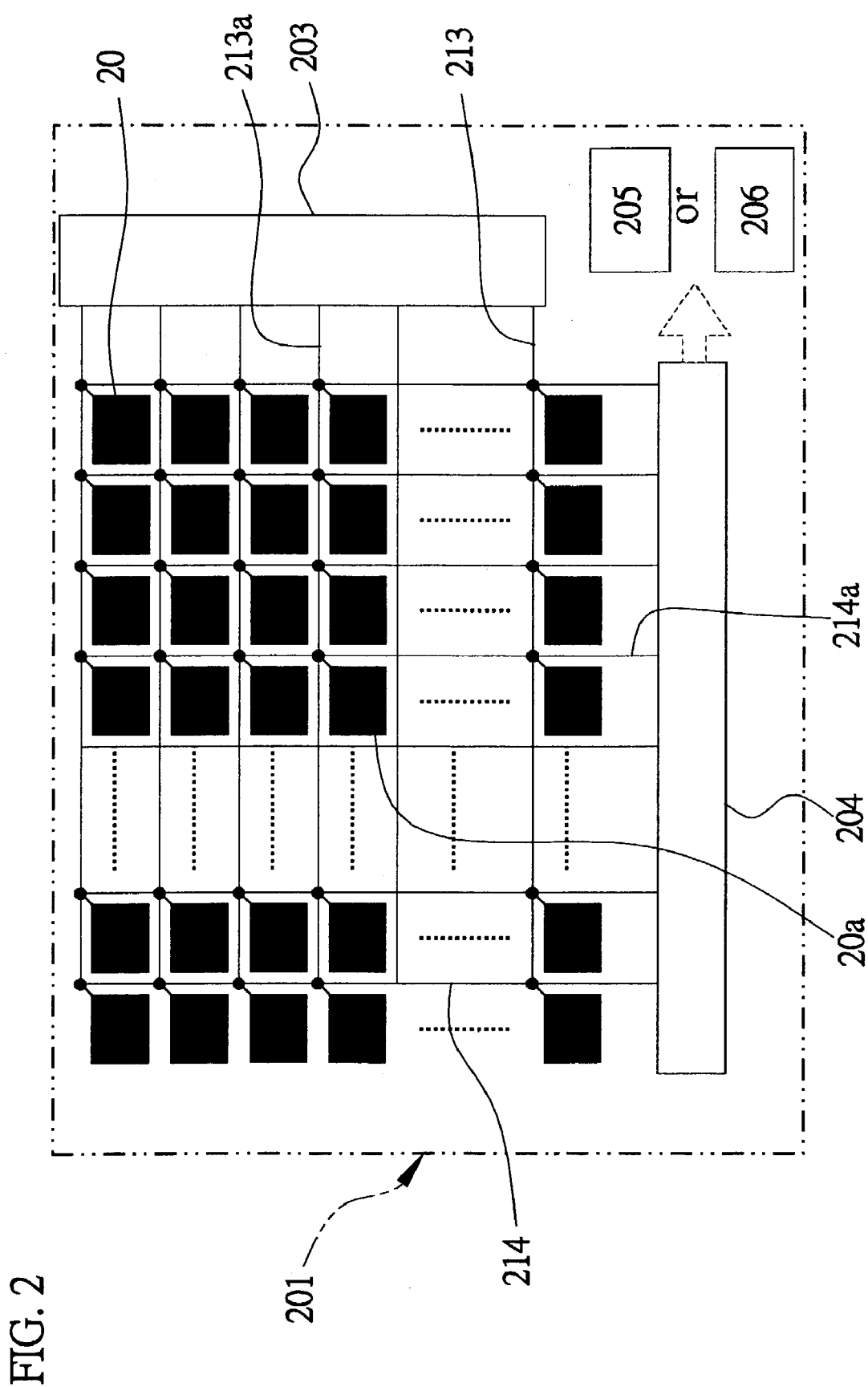
FIG. 2 is a schematic illustration showing architecture of the sensing members array of the capacitive fingerprint sensor of the invention.

As shown in FIG. 2, the row decoder 203 controls the charging and charge-sharing in a specific capacitive sensing member 20a through a specific set of control line 213a. Then, a voltage signal output from the capacitive sensing member 20a is obtained by the column multiplexer 204 via a specific signal line 214a. The obtained voltage signals may be sequentially amplified and converted into digitally gray-scale image by an analog signal processing unit 206 including a programmable gain amplifier and an analog-to-digital converter. Alternatively, the voltage signals may be compared to a reference voltage of a comparator 205, and only binary image data of 0 and 1 is output.

Figure 3:
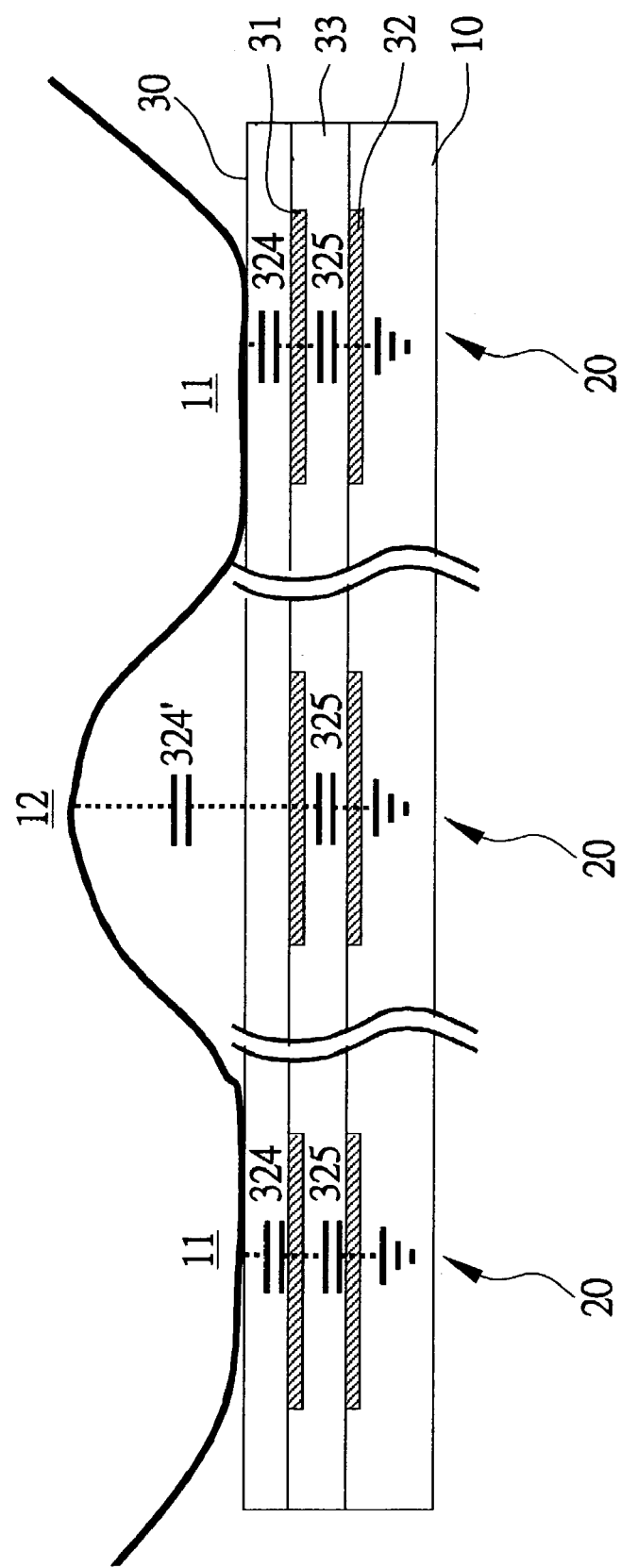
FIG. 3 is an enlarged schematic illustration showing the finger contacting the sensing member.

Referring to FIG. 3, each capacitive sensing member 20 includes a substrate 10, a reference electrode 32 formed on the substrate 10, an insulating layer 33 formed on the substrate 10 and reference electrode 32, a sense electrode 31 formed on the insulating layer 33, and an insulating surface layer 30 formed on the sense electrode 31 and insulating layer 33. The sense electrode 31 may be formed by the last interconnection metal in CMOS process. When the finger contacts the sensor, a sense capacitor 324 having capacitance Cfr is formed between the ridge 11 and the insulating surface layer 30, and a sense capacitor 324' having capacitance of Cfv is formed between the valley 12 and insulating surface layer 30. Because the finger may be regarded as a conductor and an air gap does exist between the valley 12 and insulating surface layer 30, Cfr is much greater than Cfv. The insulating surface layer 30 may be formed of material the same as that of a passivation dielectric layer in the CMOS process consisting of silicon oxide and silicon nitride materials stacked together, and the thickness of the silicon oxide and silicon nitride layers may be selected to be different from each other and within a range of 0.8 to 1.2 microns according to different CMOS processes. However, in order to lengthen the lifetime of the fingerprint sensor, a layer of high-hardness, high-dielectric-constant material, such as barium titanate, strontium titanate, silicon carbide, tantalum oxide, and the like, may be added to the insulating surface layer 30, and the thickness of the layer may range from 0.5 to 2 microns.

In addition, a reference capacitor 325 is provided between the sense electrode 31 and reference electrode 32. The design of the sense capacitor 324 and reference capacitor 325 enables the invention to apply the charge-sharing principle, which will be described later.

Figure 4:
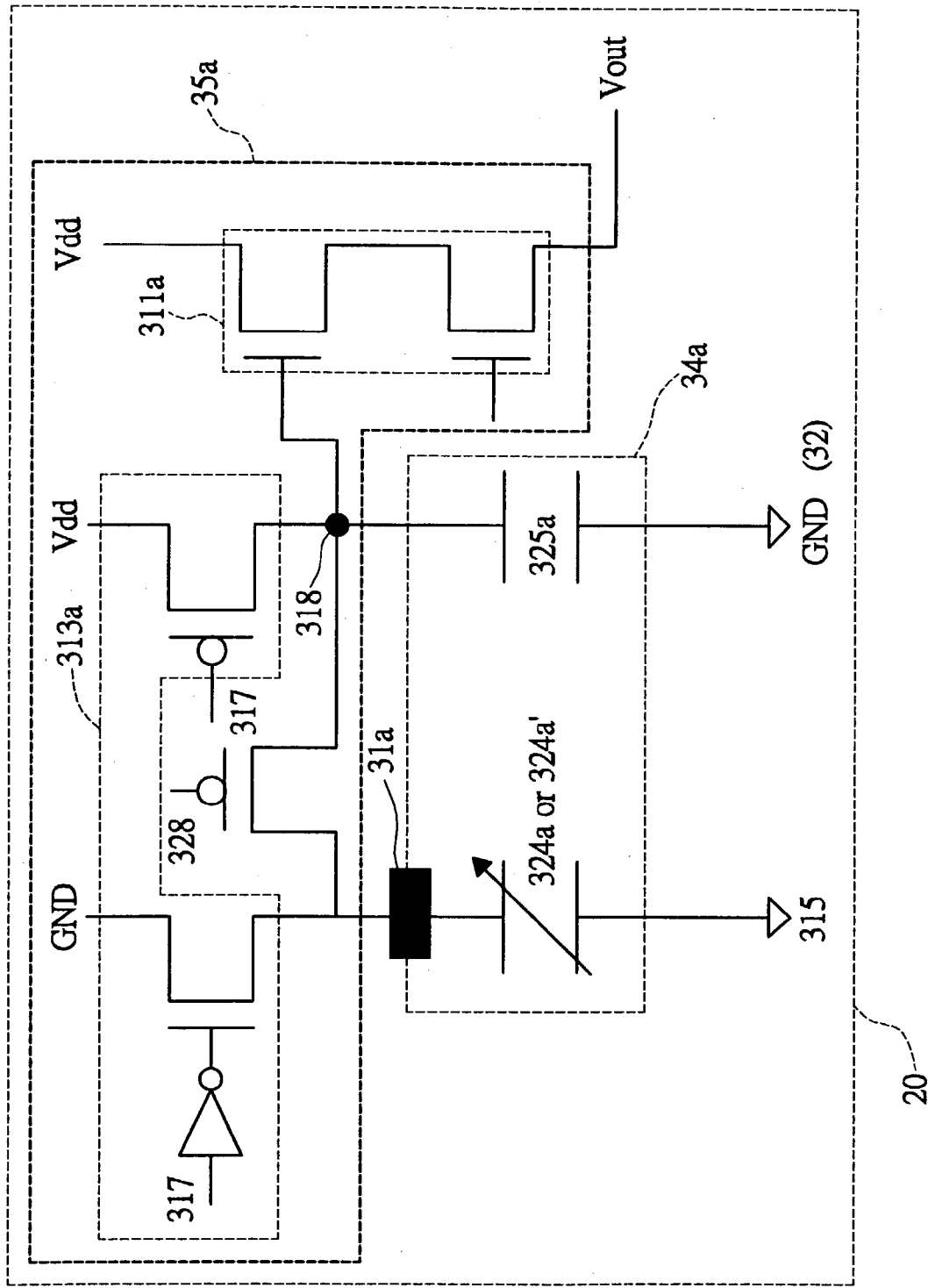
FIG. 4 is a schematic illustration showing the structure of the sensing member of the embodiment of the invention.

Referring to FIGS. 4 and 3, each capacitive sensing member 20 of the invention includes a sensor structure 34a and a signal reading circuit 35a. The sensor structure 34a includes an insulating surface layer 30, a sense electrode 31a (corresponds to element 31 of FIG. 3), a reference electrode 32, and an insulating layer 33 (FIG. 3). The insulating surface layer 30 has a finger's contact surface. The sense electrode 31a is below the insulating surface layer 30. When the finger contacts the insulating surface layer 30, a sense capacitor 324a (or 324a') is formed between the sense electrode 31a and finger. The reference electrode 32 is below the sense electrode 31. The reference capacitor 325a is connected between the reference electrode 32 and sense electrode 31a. The signal reading circuit 35a includes a shutter switch 328, a reset switch 313a and an NMOS source follower 311a. The reset switch 313a controls charging of the reference capacitor 325a and cleaning residual charges of the sense capacitor 324a (324a'). The reading mechanism and operations of the signal reading circuit 35a will be described hereinbelow.

When the fingerprint sensor is under an operation mode, the row decoder 203 sequentially and repeatedly supplies control voltages to each signal reading circuit 35a through each set of control line 213. First, a first set of control voltage 317 (0V) is supplied to the reset switch 313a to turn on the reset switch 313a, and the sense electrode 31a is thus connected to ground (0V) and the point 318 is connected to the Vdd power line. In this case, two terminals of the sense capacitor 324a or 324a' have virtually no voltage difference and the two terminals of the reference capacitor 325a has voltage difference of Vdd, and charges may be accumulated in the reference capacitor 325a. The charges Q31 is represented by $$Q31 = Vdd*(C325a+C326) \quad (1),$$

wherein C325a represents the capacitance of the reference capacitor, and C326 represents the parasitic capacitance.

Next, a second set of control voltage 317 (5V) is supplied to the reset switch 313a to turn off the reset switch 313a and thus to cut off the connection between the sense electrode 31a and GND. The sense electrode 31a is maintained at a ground voltage, and the point 318 is maintained at voltage Vdd. Meanwhile, a pulse control voltage is supplied to turn on/off the shutter switch 328, and charges Q31 accumulated in the reference capacitor 325a are shared between the sense capacitor and reference capacitor at the moment when the shutter switch 328 is turned on. After the charges are redistributed within several nanoseconds, stable voltage V31 at the point 318 may be obtained as $$V31 = Q31/(C324a+C325a+C326) \quad (2),$$

wherein C324a represents the capacitance of the sense capacitor 324a. Substituting Q31 of Equation (1) into Equation (2) may obtain:

$$V31 = Vdd*(C325a+C326)/(C324a+C325a+C326) \quad (3).$$

Compared to the capacitor C324a (50 to 150 fF) and the reference capacitor C325a (50 to 150 fF), the typical parasitic capacitor C326 (<10 fF) can be neglected, then the Equation (3) can be rewritten as $$V31 = Vdd*(C325a)/(C324a+C325a) \quad (4)$$
$$= Vdd*1/(C324a/C325a+1).$$

It is clear from Equation (4) that the V31 is determined only by the ratio of the sense capacitance to reference capacitance. That is to say, as mentioned above, good image uniformity may be obtained as long as the ratios of each sense capacitance to each corresponding reference capacitance of the sensing members in a local area can be controlled precisely.

The sense voltage V31 may be coupled and output by the NMOS source follower 311a serving as a buffer, and the voltage Vout is output to a corresponding signal line 214.

In brief, a set of the same first and second control voltages is supplied to the signal reading circuit 35a for reset function to enable two terminals of the reference capacitor 325a to have voltage difference and two terminals of the sense capacitor 324a (324a') to have no voltage difference. Then, another set of the same third and fourth control voltages and a pulse control voltage are supplied to the signal reading circuit 35a to enable the sense capacitor 324a (324a') and reference capacitor 325a to share charges and to measure the sense signals.

The shutter operations of the shutter switch 328 for charge redistribution are similar to those of the camera. So, all data in the sensing members is measured instantaneously when the finger contacts the sensor and latched at the points 318 and then read sequentially. Thus, the captured image of the fingerprint may not be deteriorated even if the user's finger moves or vibrates, which is a quite useful advantage in the embodiment.

In addition, the invention also discloses a way to solve the problem of ESD damage to the capacitive fingerprint sensor.

Figure 5:
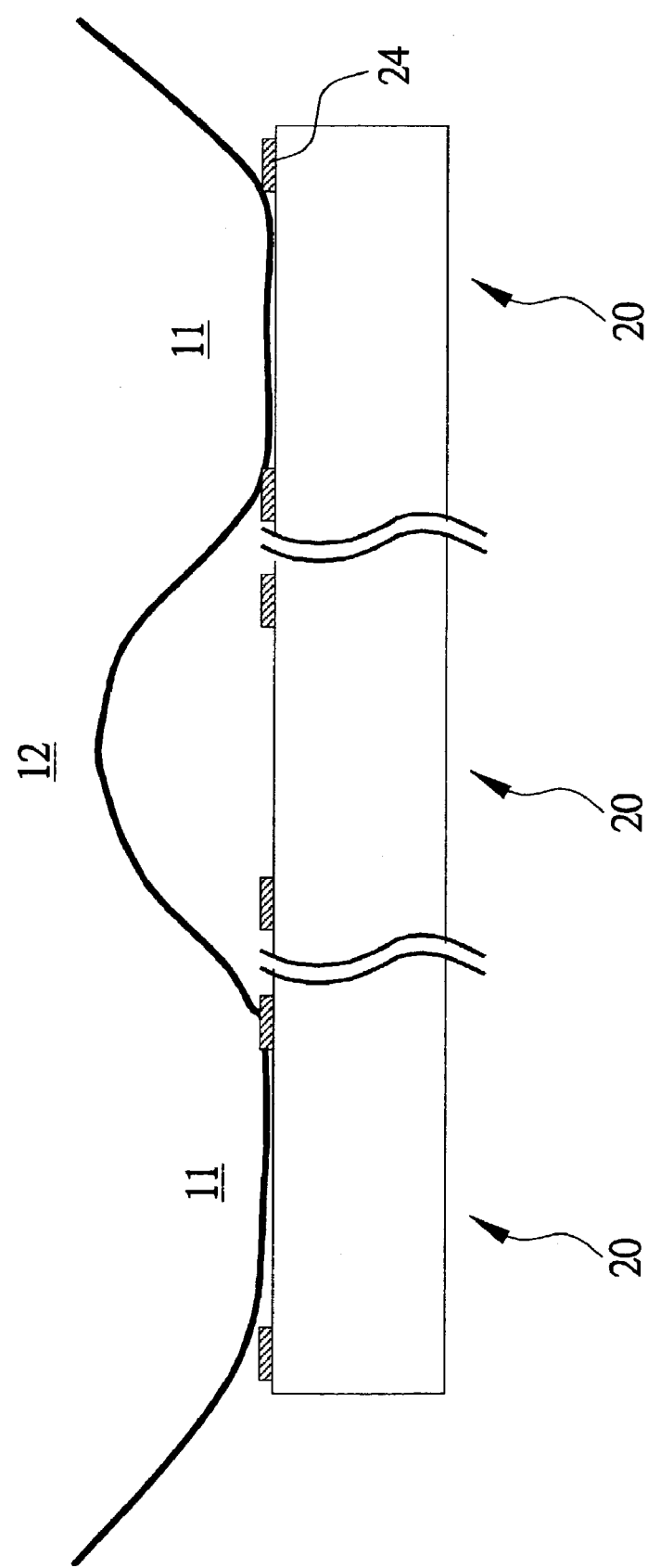
FIG. 5 is a schematic illustration showing the design of the invention to avoid ESD (Electrostatic Discharge) damage.

As shown in FIG. 5, a mesh metal film 24 may be arranged on the external surface of the fingerprint sensor 2 or below the insulating surface layer (a part of the insulating surface layer is removed to expose a part of the metal film 24 for electrostatic discharge therethrough). The mesh metal film 24 is grounded to guide the electrostatic charges to the ground GND by the principle of lightning rods. The design may eliminate the electrostatic charges and prevent the internal circuit elements of the sensor 2 from being damaged by the electrostatic charges. The mesh metal film may be made of titanium nitride in the CMOS processes because the titanium nitride is conductive and suitable for long-term usage, and may withstand wear and erosion.

Figure 6:
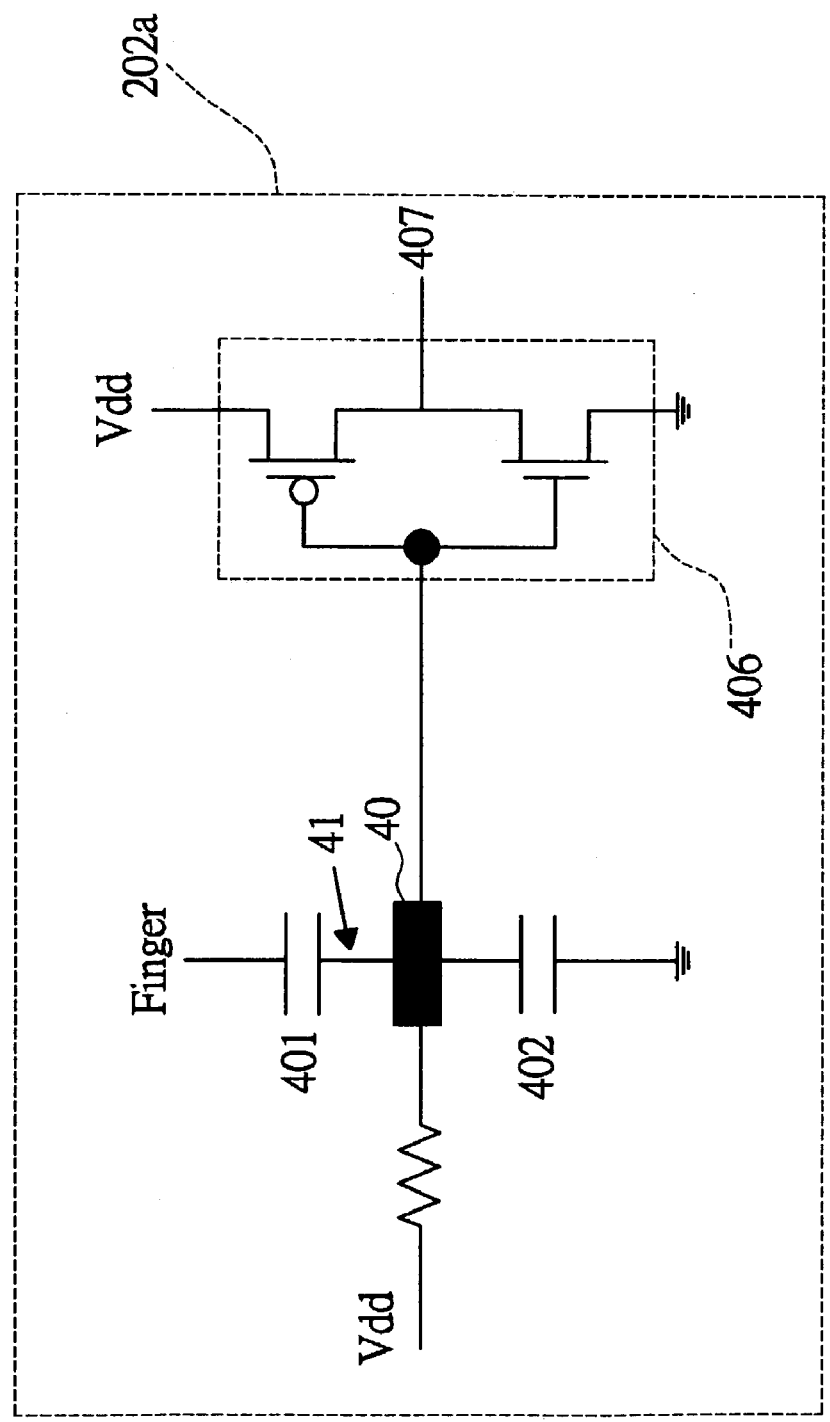
FIG. 6 is a schematic illustration showing the capacitive trigger switch of the embodiment of the invention.

In addition, the invention also provides a power-saving design by utilizing a capacitive trigger switch 202a, as shown in FIG. 6. The capacitive trigger switch 202a may turn on the sensor power after the sensor is judged to be in contact with the finger. The design may save the power consumption of the fingerprint sensor (the power consumption in operation is about 50 to 150 mW) and is advantageous to the portable electrical products. The capacitive trigger switch 202a may be regarded as a dummy sensing member, which occupies a part of the area of the capacitive sensing members. The switch 202a includes a trigger electrode 40, a trigger dielectric layer 41 and a trigger phase inverter 406. The material of the trigger dielectric layer 41 is the same as that of the insulating surface layer 30, and the layer 41 with a thickness ranging from 0.8 to 1.2 microns may be formed by the last CMOS process for forming the protective dielectric layer. Alternatively, a layer of high-stiffness, high-dielectric-coefficient material, such as barium titanate, strontium titanate, silicon carbide, tantalum oxide, and the like, may be formed as the trigger dielectric layer 41, and the thickness of the layer may range from 0.5 to 2 microns.

If the finger touches the sensor surface, a trigger capacitor 401 is formed between the finger, trigger dielectric layer 41, and trigger electrode 40. According to the charge-sharing principle, the trigger capacitor 401 shares the charges stored in the storage capacitor 402, and the voltage of the trigger electrode 40 instantly drops from the constant voltage Vdd to a voltage Vmin. When Vmin is smaller than a reverse voltage (typically from 2.0 to 2.5 volts) of the trigger phase inverter 406, a trigger signal 407 is converted from 0 to 1 to generate a rising voltage signal, which may serve as a driving signal for the trigger switch to thereby turn on the power of the fingerprint sensor 2. The design of the trigger switch 202a and manufacturing method of thereof are completely the same as those of the capacitive sensing member, and detailed description thereof is omitted. According to the trigger switch 202a, the power consumption of the fingerprint sensor may be less than 1 mW in the idle mode, and the design is quite suitable for the portable electrical products.

While the invention has been described by way of an example and in terms of a preferred embodiment, it is to be understood that the invention is not limited to the disclosed embodiment. To the contrary, it is intended to cover various modifications. Therefore, the scope of the appended claims should be accorded the broadest interpretation so as to encompass all such modifications.

What is claimed is:

1. A capacitive fingerprint sensor, comprising:
    a capacitive sensing members array including a plurality of capacitive sensing members;

an insulating surface layer covering over the sensing members array to serve as a contact surface for a finger; and a basic peripheral circuit, comprising:
a row decoder arranged beside the sensing members array;
a plurality sets of control lines inserted, in parallel, into the sensing members array and connected to the row decoder;
a column multiplexer arranged beside the sensing members array and at a side perpendicular to the row decoder;
a plurality of signal lines, which are vertically inserted into the sensing members array to intersect the control lines and is connected to the column multiplexer, wherein:
each of the capacitive sensing members comprises a sensor structure and a signal reading circuit, the sensor structure includes a sense electrode, a reference electrode, and an insulating layer between the sense and reference electrodes, the signal reading circuit is arranged beside the sensor structure to connect the sensor structure to the corresponding control and signal lines, a sense capacitor is formed between the finger and the sense electrode, and a reference capacitor is formed between the sense and the reference electrodes; and
the basic peripheral circuit repeatedly inputs, through the control lines:
a set of the same first and second control voltages to the signal reading circuit for reset function to enable two terminals of the reference capacitor to have voltage difference and two terminals of the sense capacitor to have no voltage difference; and
another set of the same third and fourth control voltages and a pulse control voltage to the signal reading circuit so as to enable the sense capacitor and the reference capacitor to share charges and to read the sense signals.

2. The fingerprint sensor according to claim 1, wherein the basic peripheral circuit further comprises:
an analog signal processing unit comprising a programmable gain amplifier and an analog-to-digital converter for amplifying and converting voltage signals output from the column multiplexer into digital gray-scale image data, respectively.

3. The fingerprint sensor according to claim 1, wherein the signal reading circuit comprises:
a reset switch for controlling charging of the reference capacitor and cleaning residual charges of the sense capacitor a shutter switch for controlling connection between the sense capacitor and the reference capacitor, wherein the sense capacitor and the reference capacitor share the charges at a moment when the shutter switch is turned on and then off; and
an NMOS source follower serving as a buffer for coupling balanced voltage after charge-sharing between the sense and reference capacitors to the signal lines.

4. The fingerprint sensor according to claim 1, wherein the peripheral circuit further comprises:
a comparator connected to the column multiplexer for comparing the voltage signals output from the column multiplexer with a reference voltage of the comparator, and then outputting binary image data of 0 and 1.

5. The fingerprint sensor according to claim 1, further comprising a mesh metal film arranged on the insulating surface layer and connected to ground to avoid ESD damage.

6. The fingerprint sensor according to claim 1, further comprising a mesh metal film arranged below the insulating surface layer and connected to ground, wherein a part of the insulating surface layer is removed to expose a part of the metal film for electrostatic discharge therethrough so as to avoid ESD damage.

7. The fingerprint sensor according to claim 1, further comprising a trigger switch for turning on a sensor power after the sensor is judged to be in contact with the finger.

8. The fingerprint sensor according to claim 7, wherein the trigger switch comprises:
a trigger electrode;
a trigger dielectric layer arranged on the trigger electrode; and
a trigger phase inverter, wherein when the finger contacts the trigger switch, a trigger capacitor is formed between the finger and the trigger electrode, the trigger capacitor and a storage capacitor below the trigger electrode share charges to decrease a voltage of the trigger electrode below a reverse voltage for inverting the trigger phase inverter, and then to turn on the sensor power of the capacitive fingerprint sensor.

9. The fingerprint sensor according to claim 8, further comprising a layer of barium titanate, strontium titanate, silicon carbide or tantalum oxide formed on the trigger dielectric layer.

10. The fingerprint sensor according to claim 1, further comprising a layer of barium titanate, strontium titanate, silicon carbide or tantalum oxide formed on the insulating surface layer.

* * * * *